United States Patent [19]
Forsell

[11] Patent Number: 5,463,613
[45] Date of Patent: Oct. 31, 1995

[54] MOTOR DRIVE UNIT FOR A RECORD PLAYER

[76] Inventor: Peter Forsell, Goetalandsvaegen 188, Aelvsjoe, Sweden, S-12535

[21] Appl. No.: 37,613

[22] Filed: Mar. 25, 1993

[30] Foreign Application Priority Data

Mar. 27, 1992 [SE] Sweden .................................. 9200956

[51] Int. Cl.⁶ ..................................................... G11B 3/60
[52] U.S. Cl. ............................................. 369/266; 369/264
[58] Field of Search .................................. 369/263, 264, 369/265, 266, 269, 267

[56] References Cited

U.S. PATENT DOCUMENTS

| | | | |
|---|---|---|---|
| 3,030,115 | 4/1962 | Hardy et al. | 369/266 |
| 3,047,297 | 7/1962 | Drake | 369/269 |
| 3,103,364 | 9/1963 | Macks et al. | 369/269 |
| 3,384,378 | 5/1968 | Allen | 369/266 |
| 3,542,371 | 11/1970 | Saito | 369/266 |
| 3,663,075 | 5/1972 | Kronenberg | 105/77 |
| 3,833,225 | 9/1974 | Pettersson | 369/266 |
| 4,047,721 | 9/1977 | Hermann | 369/266 |
| 4,100,465 | 7/1978 | Hagino | 369/266 |
| 4,194,743 | 3/1980 | Ohsawa et al. | 369/269 |
| 4,256,312 | 3/1981 | Ikeda | 369/269 |
| 4,766,587 | 8/1988 | Dons et al. | 369/263 |

*Primary Examiner*—Stuart S. Levy
*Assistant Examiner*—Paul J. Ditmyer
*Attorney, Agent, or Firm*—Townsend and Townsend and Crew

[57] ABSTRACT

A drive for the turntable of an analogue record player has an output shaft for rotating the turntable via an endless belt extending around the output shaft and the periphery of the turntable. A disc rotatably supported in line with and connected to the output shaft for rotation therewith has a diameter considerably exceeding the diameter of the output shaft. A motor rotates the disc with a speed considerably greater than that of the turntable.

19 Claims, 2 Drawing Sheets

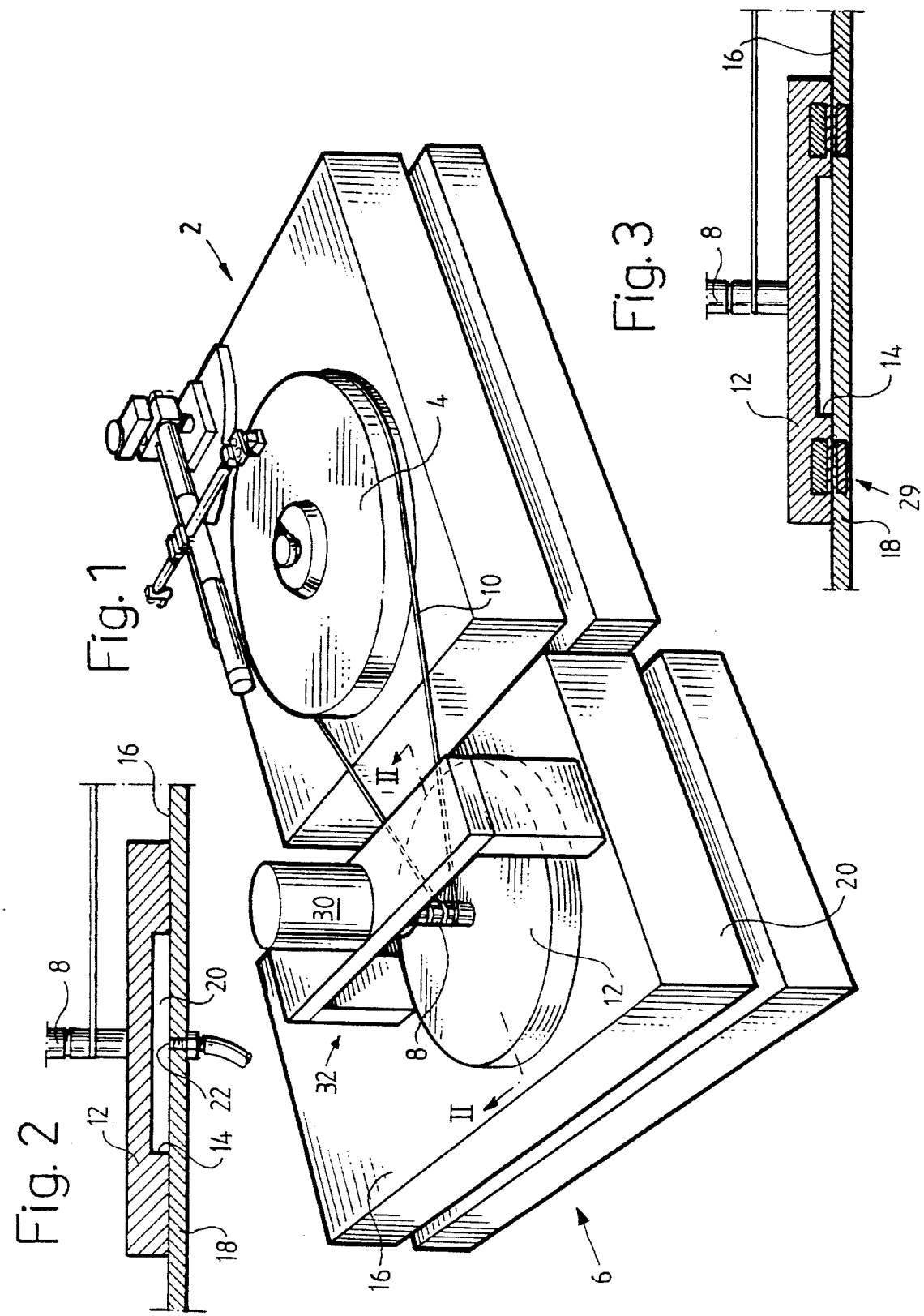

MOTOR DRIVE UNIT FOR A RECORD PLAYER

BACKGROUND

The present invention generally relates to an arrangement for driving an analogue record player. Conventionally, in such an arrangement, the turntable of a record player may be driven from a motor drive by means of an endless drive belt applied around an output drive shaft of the motor and the outer periphery of the turntable.

STATE OF THE ART

Generally it is known to use record players with an air supported turntable for decreasing disturbances reaching the turntable and for obtaining a smoother run. Also, it is earlier known to let a motor driven record player drive another record player by peripheral engagement between the peripheries of the turntables of the respective record players.

Through U.S. Pat. No. 4,256,312 it is known to use an air supported turntable assembly, in which the angular momentum of the turntable is increased by increasing the peripheral mass thereof. The turntable may be driven either by means of an endless belt applied around the output shaft of a motor drive and the periphery of the turntable, or directly by the output shaft.

Through FR 2 278 128 it is known to air cushion the motor shaft of a record player, the turntable of which is directly driven, and has an increased angular momententum.

JP Abstract 58-200403 and DE 25 37 758 disclose other examples of air supported drive means for record players.

SUMMARY OF THE INVENTION

It is a principal object of the invention to provide an improved motor drive included in a driving arrangement for an analogue record player.

According to the invention the motor drive includes an output shaft for driving said record player, a disc rotatably supported in line with and connected to the output shaft for rotation therewith, the disc having a diameter considerably exceeding the diameter of said output shaft, and a motor for rotating the disc with a speed considerably greater than that of said record player.

By stating that the disc has a diameter considerably exceeding that of the output shaft should be generally meant, as an example, that the ratio between the diameters could be of an order of magnitude comparable to the ratio between the diameter of the turntable of a conventional record player and that of the motor shaft driving said turntable.

Furthermore, by stating that the motor should rotate the disc with a speed considerably greater than that of the record player should generally be meant, as an example, that the ratio between the rotational speed of the disc and that of the turntable of the record player could be of an order of magnitude of at least 20, preferably 30–50.

In the motor drive according to the invention, where the output shaft is directly coupled to a disc rotated at a preferably very high speed, the kinetic energy of the disc is related to disc mass×disc rotational speed$^2$. Thereby an inherently very high kinetic energy is obtainable, and transferable, e.g. via a belt drive, to the disc turntable of a conventional analogue record player. In practise it has thus been possible to obtain a kinetic energy in the disc which is several tenth powers higher than that obtainable thus far in a disc turntable of a conventional analogue record player.

Stated otherwise, a conventional turntable may be run with a rotational speed of 33,3 rpm. If the mass of the turntable is increased 10 times, e.g. from 3 kg to 30 kg, the kinetic energy thereof will increase 10 times. If instead the rotational speed would be increased from 33,3 rpm to 1000 rpm the kinetic energy would be increased 900 times. The same increase of the kinetic energy of the record player turntable, but with a maintained rotational speed of 33,3 rpm, is obtainable by driving said turntable by means of the motor drive according to the invention.

The invention has turned out to result in a more stable run, a considerable sound improvement, a lower distorsion and a more stable and faster sound.

It should be realized that using a strong motor for driving the disc included in the motor drive according to the invention would to some extent counteract the advantages obtainable with the invention by introducing vibrations. Therefor, in order to be able to use a disc with a mass as great as possible, the disc should preferably be journalled such as to enable use of a comparably weak motor of the kind used for conventionally driving a record player turntable, e.g. as described in the prior art mentioned above. According to a very advantageous embodiment of the invention an air bearing mechanism is used, preferably one into which a shape of the disc is integrated that gives to the disc a high peripheral mass for obtaining a high moment of inertia.

DESCRIPTION OF THE DRAWINGS

The invention will now be described more closely below with reference to the accompanying drawings, in which FIG. 1 is a perspective view illustrating one embodiment of a motor drive in accordance with the invention connected for driving an analogue record player, FIG. 2 in smaller scale shows a section in the direction of arrow II of FIG. 1 for illustrating an air bearing for the motor drive of FIG. 1, FIG. 3 in a similar section as in FIG. 2 schematically illustrates a magnetic bearing for the motor drive.

PREFERRED EMBODIMENTS

Figure 4:
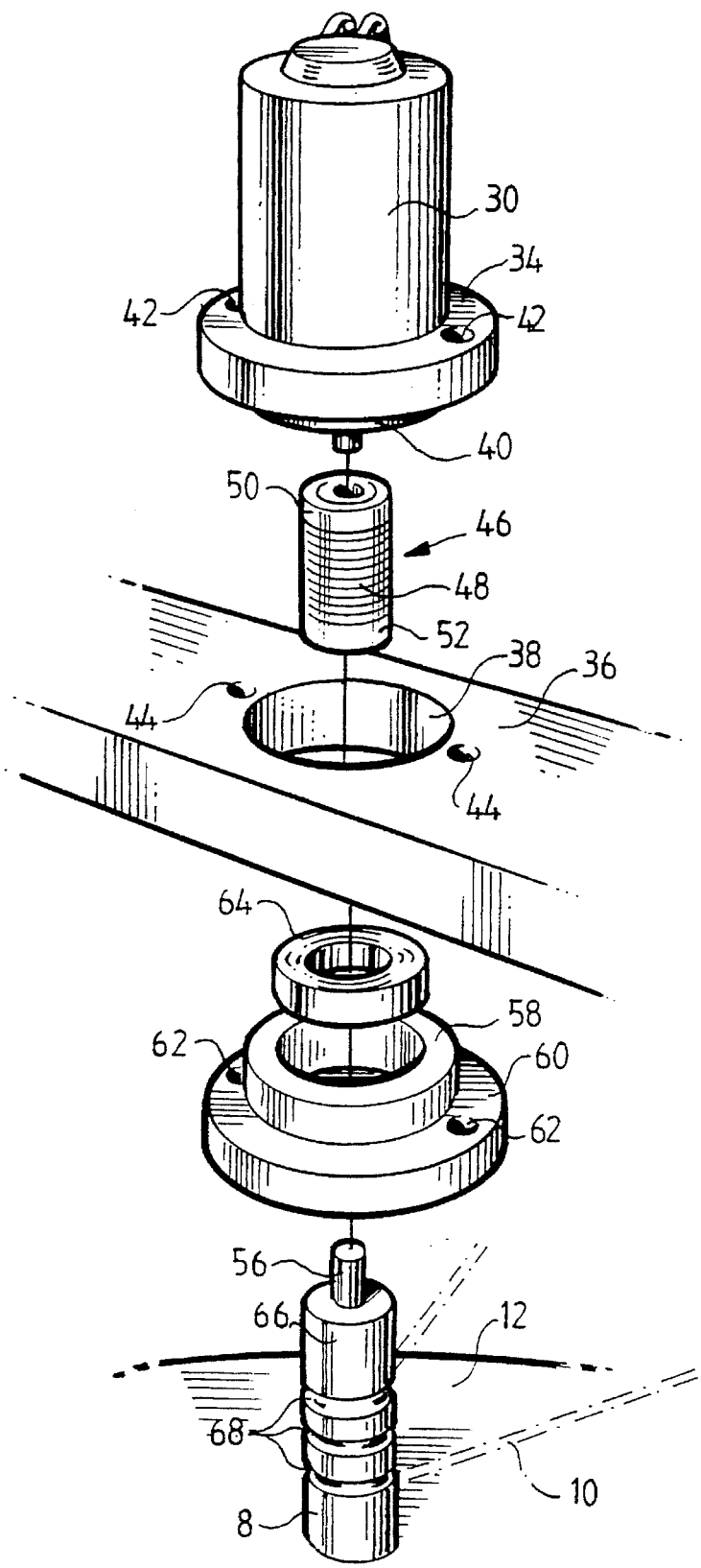
FIG. 4 is an exploded perspective view in an enlarged scale illustrating a motor mounting for the motor drive according to FIG. 1.

In FIG. 1 an analogue record player is generally designated 2. The player 2 has a turntable 4 for carrying a disc record, not shown. The player 2 does not form part of the invention and can be of a type known per se, wherein the turntable 4 is intended to be rotated by a motor via a belt drive.

A motor drive unit generally designated 6 has an output shaft 8 intended for rotating an analogue record player turntable, such as the turntable 4, by means of an endless belt 10 extending around the shaft 8 and the periphery of the turntable. The shaft 8 extends uppwardly from a circular disc 12 fixedly attached to the centre thereof. The disc 12 has a diameter considerably exceeding the diameter of the shaft 8 and a recess 14 in its lower surface. Due to the recess 14 the disc 12 has a great peripheral mass and thereby a high moment of inertia.

With reference also to FIGS. 2 and 3, the disc 12 with its lower ring shaped surface surrounding the recess 14 is slidably supported on an upper plane and unrecessed surface 16 of an upper wall 18 of a generally box shaped base unit

20.

In FIG. 2 the recess 14 also forms part of an air bearing mechanism for the disc 12 by enclosing with the surface 16 a space 20, having an air intake 22 opening through the wall 18. In operation of the motor drive unit 6 air blowing through the intake 22 builds up a pressure in the space 20 while leaking out between the lower ring shaped surface of the disc 12 and the abutting part of the surface 16. This affords to the disc 12 a practically frictionless rotational air bearing.

Whereas an air bearing for the disc included in the motor drive according to the invention has been described with reference to FIG. 2, the use of any bearing adapted to the choice of drive motor for the disc would be conceivable. In particularly, as shown in FIG. 3, another type of suitable low friction bearing would be a magnetic bearing formed by two magnet rings having the same polarity and located oppositely each other in the wall 18 and disc 12, respectively, as generally indicated at 29.

A motor 30 is coupled to the shaft 8 for rotating the disc 12. More particularly the motor 30 is carried on a bridge like support 32 mounted on the upper surface of the base unit 16 and bridging the disc 12. The motor 30 is designed for rotating the shaft 8 and disc 12 with a speed considerably higher than that of the turntable 4.

FIG. 4 in more detail illustrates the mounting of the motor 30 and the coupling between the motor and the shaft 8. More particularly, the motor 30 by means of a flange 34 is carried on a horisontal part 36 of the bridge 32 coaxially in line with a through hole 38 in the part 36, into which a portion 40 of the motor located below the flange 34 extends. At 42 and 44 bolt holes in the flange 34 and the bridge part 36, respectively, are shown for indicating the use of bolt joints, not shown, for joining together the flange 34 and bridge part 36.

The motor 30 and the shaft 8 are connected together by means of a coupling element 46. The coupling element 46 has a spiral shaped main body 48 giving to the element 46 a certain lengthwise mobility. The main body 48 at both ends is integrally joined to coupling sockets 50 and 52, respectively. The sockets 50 and 52 are dimensioned for clampingly receiving the end 54 of an output shaft of the motor 30 and an end pin 56 of the shaft 8, respectively.

For guiding and mounting the shaft 8 in line with the coupling element 46 a guiding ring 58 fits in the hole 38 and is attached to the underside of the bridge part 36 by means of a lower mounting flange 60, in which bolt holes 62 are shown for indicating the use of bolt joints. In the ring 58 a ball bearing 64 fits for receving an upper part 66 of the shaft 8.

By means of the coupling element 46 a certain degree of lengthwise and sidewise mobility of the shaft 8 is obtainable for allowing a corresponding freedom of mobility of the disc 12 in the above described air bearing.

At 68 groves in the shaft 8 are indicated which have different depths for allowing choice of different bolt drive exchanges for driving the turntable 4.

Above a presently preferred embodiment of the invention has been described with reference to the drawings. The scope of the invention is however not restricted to this embodiment but is determined solely by the attached patent claims.

Thus, the disc need not be driven by a motor mounted above the disc as in the described embodiment, but other mounting arrangements could be used. Thus, the motor can e.g. as well be mounted below the disc or sidewise with respect thereto. In the latter case a belt drive between the motor and the disc would be preferable.

I claim:

1. A motor drive for an analogue record, comprising:
    a turntable adapted to carry a record player and having a periphery;
    an output shaft for rotating said turntable;
    a belt extending around said output shaft and the periphery of said turntable;
    a disc rotatably supported in line with and connected to said output shaft for rotation therewith, said disc having a diameter substantially greater than the diameter of said output shaft such that the disc imparts a relatively uniform rotational speed to the output shaft; and
    a motor for rotating said disc with a speed considerably greater than a speed of said turntable, the speed of the disc being at least 20 times the speed of the record player.

2. A motor drive according to claim 1, wherein: said disc is supported by a low friction bearing.

3. A motor drive according to claim 2, wherein: said low friction bearing is an air bearing.

4. A motor drive according to claim 3, wherein: said air bearing supports said disc on a planar unrecessed surface.

5. A motor drive according to claim 3, wherein: said air bearing is formed by an air bearing mechanism, into which a shape of the disc is integrated, the shape of the disc having a high peripheral mass and a high moment of inertia.

6. A motor drive according to claim 2, wherein: said low friction bearing is a magnet bearing.

7. A motor drive according to claim 1, wherein: said motor is directly connected to said disc for rotating the disc.

8. A motor drive according to claim 7, wherein: said motor is mounted on a bridge extending over said disc.

9. A motor drive according to claim 8, wherein: said output shaft extends between said disc and said motor, and said motor is connected for rotating said disc by rotating said output shaft.

10. A motor drive according to claim 1, wherein:
    the speed of the disk is at least 30–50 times the speed of the turntable.

11. A driving arrangement for an analogue record player, comprising:
    a turntable adapted to carry a record and having a periphery, the periphery having a peripheral diameter;
    an output shaft for rotating said turntable, the output shaft having an output diameter, the peripheral diameter of the turntable being at least 20 times the output diameter of the output shaft;
    a belt extending around said output shaft and the periphery of said turntable, the belt extending around the periphery at the peripheral diameter and extending around the output shaft at the output diameter;
    a disc rotatably supported by a low friction bearing and in line with and connected to said output shaft for rotation therewith, said disc having a diameter a plurality of times greater than the diameter of said output shaft; and
    a motor for rotating said disc at a speed considerably greater than that of said turntable.

12. A motor drive according to claim 11, wherein: said low friction bearing is an air bearing.

13. A motor drive according to claim 12 wherein: said air bearing supports said disc on a planar unrecessed surface.

14. A motor drive according to claim 12, wherein: said air bearing is formed by an air bearing mechanism, into which a shape of the disc is integrated, the shape of the disc having a high peripheral mass and a high moment of inertia.

15. A motor drive according to claim 11, wherein: said low friction bearing is a magnet bearing.

16. A motor drive according to claim 11, wherein: said motor is directly connected to said disc rotating the disc.

17. A motor drive according to claim 16, wherein: said motor is mounted on a bridge extending over said disc.

18. A motor drive according to claim 16, wherein: said output shaft extends between said disc and said motor, and said motor is connected for rotating said disc by rotating said output shaft.

19. A motor drive according to claim 11, wherein:

the peripheral diameter is at least 30–50 times the output shaft diameter.

* * * * *